United States Patent
Shaked et al.

(10) Patent No.: US 8,532,237 B2
(45) Date of Patent: Sep. 10, 2013

(54) CORRECTION OF ALTERNATING I/Q IMBALANCE AND FREQUENCY OFFSET IMPAIRMENTS

(75) Inventors: Ronen Shaked, Netanya (IL); Jonathan Friedmann, Tel Aviv (IL)

(73) Assignee: Provigent LTD (IL)

( * ) Notice: Subject to any disclaimer, the term of this patent is extended or adjusted under 35 U.S.C. 154(b) by 841 days.

(21) Appl. No.: 12/702,351

(22) Filed: Feb. 9, 2010

(65) Prior Publication Data

US 2011/0194656 A1    Aug. 11, 2011

(51) Int. Cl.
    *H04B 1/10* (2006.01)
(52) U.S. Cl.
    USPC ........... 375/346; 375/316; 375/327; 375/340; 375/344; 455/63.1; 455/67.13; 455/114.2; 455/296; 455/501; 370/335; 370/342; 327/551
(58) Field of Classification Search
    USPC ........ 375/316, 324, 340, 344, 346; 455/63.1, 455/67.13, 114.2, 296, 501; 370/335, 342; 327/551
    See application file for complete search history.

(56) References Cited

U.S. PATENT DOCUMENTS

| | | | |
|---|---|---|---|
| 5,844,948 A * | 12/1998 | Ben-Efraim et al. | ......... 375/344 |
| 5,949,821 A | 9/1999 | Emami et al. | |
| 6,844,787 B2 | 1/2005 | Vann et al. | |
| 7,010,059 B2 * | 3/2006 | Song et al. | ..................... 375/316 |
| 7,181,205 B1 | 2/2007 | Scott et al. | |
| 7,433,298 B1 | 10/2008 | Narasimhan | |
| 7,486,748 B2 | 2/2009 | Mak et al. | |
| 2007/0291863 A1 | 12/2007 | Saed | |

FOREIGN PATENT DOCUMENTS

| | | |
|---|---|---|
| WO | 2009/063447 A2 | 5/2009 |
| WO | 2009/082457 A1 | 7/2009 |
| WO | 2009/083949 A2 | 7/2009 |

OTHER PUBLICATIONS

Friedmann, J., U.S. Appl. No. 12/553,101 "Receiver with re-demodulation", filed on Sep. 3, 2009.

International Application PCT/IB2010/055661 Search Report dated Jul. 5, 2011.

* cited by examiner

*Primary Examiner* — Leon Flores
(74) *Attorney, Agent, or Firm* — Sterne, Kessler, Goldstein & Fox PLLC (57) ABSTRACT

A method for communication includes receiving a signal, which carries data bits and is distorted by multiple impairments including one or more frequency offsets and one or more In-phase/Quadrature (I/Q) imbalances. A corrected signal is produced by applying to the received signal a sequence of corrections to compensate for the impairments. The sequence includes a first and a third correction of one correction type and a second correction of another correction type intervening between the first and third corrections in the sequence, the correction types consisting of frequency offset corrections and I/Q imbalance corrections. The data bits are extracted from the corrected signal.

14 Claims, 3 Drawing Sheets

CORRECTION OF ALTERNATING I/Q IMBALANCE AND FREQUENCY OFFSET IMPAIRMENTS

FIELD OF THE INVENTION

The present invention relates generally to communication systems, and particularly to methods and systems for compensating for In-phase/Quadrature (I/Q) imbalance and frequency offset impairments.

BACKGROUND OF THE INVENTION

Many Radio Frequency (RF) transmitters and receivers use In-phase/Quadrature (I/Q) configurations, in which a signal is represented by two orthogonal signal components. In some cases, however, the transmitter and/or receiver circuitry introduce I/Q imbalance impairments, which distort the signal and degrade the reception performance. Reception performance may also be degraded by frequency offsets introduced by the transmitter and/or receiver.

Various techniques for compensating for I/Q imbalance and frequency offset impairments are known in the art. For example, U.S. Pat. No. 7,433,298, whose disclosure is incorporated herein by reference, describes techniques for correcting residual frequency offset, phase noise and I/Q imbalance in Orthogonal Frequency Division Multiplexing (OFDM) communications. The disclosed techniques compensate for I/Q imbalance based on most likely estimates of the I/Q imbalance between the I and Q components of a baseband signal. Most likely estimates of the common phase error are sometimes used to compensate for the initial channel estimates.

PCT International Publication WO 2009/082457, whose disclosure is incorporated herein by reference, describes a signal processing method and system for compensation of I/Q imbalance for a direct conversion packet-switched OFDM communications system. Both frequency-dependent I/Q imbalance and frequency-independent cases are considered, covering both wideband and narrowband modulation.

U.S. Pat. No. 7,181,205, whose disclosure is incorporated herein by reference, describes a self-calibration procedure that corrects the amplitude and phase errors of the modulation and demodulation in a transceiver. A test signal is applied to the baseband input of the transmitter, and the output of the modulator is looped back to the input of the demodulator. The amplitude and phase errors of the resulting signal at the baseband output of the receiver are detected, and the contributions of the transmitter and receiver to the errors are separated and resolved into amplitude and phase components. Adjustments are then made to the amplitude and phase balance in the transmit and receive signal paths to correct the errors.

SUMMARY OF THE INVENTION

An embodiment of the present invention that is described herein provides method for communication, including:

receiving a signal, which carries data bits and is distorted by multiple impairments including one or more frequency offsets and one or more In-phase/Quadrature (I/Q) imbalances;

producing a corrected signal by applying to the received signal a sequence of corrections to compensate for the impairments, the sequence including a first and a third correction of one correction type and a second correction of another correction type intervening between the first and third corrections in the sequence, the correction types consisting of frequency offset corrections and I/Q imbalance corrections; and extracting the data bits from the corrected signal.

In some embodiments, applying the sequence includes applying the corrections for the respective impairments in reverse order to an order in which the impairments distort the signal. In an embodiment, producing the corrected signal includes calculating at least one of the corrections in the sequence based on the extracted data bits. Calculating the corrections may include generating an error signal for setting a given correction in the sequence based on the extracted data bits, processing the error signal so as to reverse a subset of the corrections that are subsequent to the given correction is the sequence, and setting the given correction based on the processed error signal.

In a disclosed embodiment, the second correction includes an I/Q imbalance correction and the third correction includes a frequency offset correction, and producing the corrected signal includes calculating an error signal based on the extracted data bits, de-rotating the error signal to compensate for the third correction, and calculating the second correction based on the de-rotated error signal. In another embodiment, the first and third corrections include respective first and second frequency offset corrections, the second correction includes an I/Q imbalance correction, and producing the corrected signal includes applying the first and second frequency offset corrections jointly to the received signal, applying the I/Q imbalance correction to the signal after applying the first and second frequency offset corrections, and rotating the I/Q imbalance correction to compensate for the second frequency offset correction.

In another embodiment, the impairments further include at least one I/Q delay mismatch, and producing the corrected signal includes compensating for the I/Q delay mismatch by applying an I/Q delay mismatch correction in the sequence. In yet another embodiment, at least one of the frequency offsets is caused by a deviation between a first reference clock used in a transmitter transmitting the signal and a second reference clock used in a receiver receiving the signal. In still another embodiment, at least one of the frequency offsets is caused by a digital frequency offset in a transmitter transmitting the signal.

In some embodiments, the method further includes producing the signal by:

in a first transmitter unit, up-converting an input signal to produce an Intermediate Frequency (IF) signal based on a first reference clock, so as to cause a first I/Q imbalance;

sending the IF signal from the first transmitter unit to a second transmitter unit; and in the second transmitter unit, down-converting the IF signal based on a second reference clock, and re-up-converting the signal to Radio Frequency (RF), so as to cause a frequency offset, followed by a second I/Q imbalance.

In an embodiment, the signal is produced without transferring a clock signal between the first and second transmitter units.

In some embodiments, receiving the signal includes:

in a first receiver unit; down-converting a Radio Frequency (RF) signal and up-converting the down-converted signal to produce an Intermediate Frequency (IF) signal based on a first reference clock;

sending the IF signal from the first receiver unit to a second receiver unit; and in the second receiver unit, down-converting the IF signal based on a second reference clock, so as to cause a frequency offset followed by a second I/Q imbalance.

In an embodiment, the signal is received without transferring a clock signal between the first and second receiver units.

There is additionally provided, in accordance with an embodiment of the present invention, a communication apparatus, including:

compensation circuitry, which is configured to receive a signal that carries data bits and is distorted by multiple impairments including one or more frequency offsets and one or more In-phase/Quadrature (I/Q) imbalances, and to produce a corrected signal by applying to the received signal a sequence of corrections to compensate for the impairments, the sequence including a first and a third correction of one correction type and a second correction of another correction type intervening between the first and third corrections in the sequence, the correction types consisting of frequency offset corrections and I/Q imbalance corrections; and a slicer unit, which is configured to extract the data bits from the corrected signal.

The present invention will be more fully understood from the following detailed description of the embodiments thereof, taken together with the drawings in which:

DETAILED DESCRIPTION OF EMBODIMENTS

Overview

In a typical Radio Frequency (RF) communication system, a transmitter produces a modulated signal that carries data, and transmits the signal to a receiver. The receiver processes the received signal so as to recover the data. Transmitters and receivers often represent the signal using two orthogonal signal components, referred to as In-phase (I) and Quadrature (Q) components. Various digital and analog transmitter and receiver components (e.g., digital-to-analog and analog-to-digital converters, quadrature modulators and demodulators, filters and mixers) process the signal by operating on the I and Q components.

Transmitter and receiver components may introduce imbalance between the I and Q signal components. Generally, I/Q imbalance may comprise gain imbalance (different gain applied to the I and Q components), phase imbalance (non-orthogonality between the I and Q components), delay or group delay mismatch between the I and Q components, and/or DC offset (a constant offset in the I and/or Q components). All of these impairments are collectively referred to herein as I/Q imbalance. In addition, the transmitter and receiver often introduce frequency offset into the signal, such as when the transmitter and receiver use different reference clocks. Excessive I/Q imbalance and frequency offset may distort the spectral shape of the transmitted signal and/or the signal received by the receiver, and therefore degrade the receiver performance.

In some communication systems, the signal is subjected to an alternating sequence of I/Q imbalance and frequency offset impairments as it is processed by the transmitter and/or receiver. For example, the signal may initially be up-converted in the transmitter by an I/Q modulator that introduces I/Q imbalance, then transmitted to the receiver and received with a certain frequency offset, and then down-converted by an I/Q demodulator that introduces additional I/Q imbalance.

Generally, I/Q imbalance impairments and frequency offset impairments are not commutative. In other words, two I/Q imbalance impairments cannot generally be modeled by a single time-invariant I/Q imbalance if there is an intervening frequency offset. Similarly, two frequency offset impairments cannot generally be modeled by a single time-invariant frequency offset if there is an intervening I/Q imbalance. Therefore, known compensation schemes that compensate for a single I/Q imbalance and/or a single frequency offset are usually ineffective for signals that are distorted by interleaved I/Q imbalance and frequency offset impairments.

Embodiments of the present invention that are described hereinbelow provide improved receiver configurations, which compensate for alternating sequences of I/Q imbalance and frequency offset impairments. In some embodiments, a demodulator at the receiver comprises a cascade of I/Q correction and frequency correction modules, which is arranged in reverse order to the order of the impairments that distort the signal. The demodulator thus applies a sequence of alternating I/Q imbalance and frequency offset corrections.

Consider, for example, a signal that is first subjected to a frequency offset denoted $\Delta F1$, then to an I/Q imbalance denoted $\Delta IQ$, and then to another frequency offset denoted $\Delta F2$. A demodulator that compensates for this distortion may comprise a frequency correction module for correcting $\Delta F2$, followed by an I/Q correction module that corrects $\Delta IQ$, and followed by another frequency correction module that corrects $\Delta F1$. In some embodiments, a sequence of two frequency offsets with an intervening I/Q imbalance is compensated for by a single frequency correction module, followed by an I/Q correction module whose correction varies over time as a function of the first frequency offset.

Typically, the corrections applied by the different I/Q correction and frequency correction modules are decision-directed, i.e., depend on the data that is extracted from the signal by the receiver. Alternatively, however, some corrections may be computed using blind adaptation. In some embodiments, the corrections are computed in an adaptive process, such as using Least Mean Squares (LMS) adaptation.

The compensation schemes described herein are applicable to any suitable communication system in which the signal is subjected to an alternating sequence of I/Q imbalance and frequency offset impairments. Several example system configurations and corresponding compensation schemes are described herein. By using the disclosed techniques, the receiver is able to compensate for complex combinations of I/Q imbalance and frequency offset with high accuracy, and therefore demodulate the data with high reliability.

Example System Configuration

Figure 1:
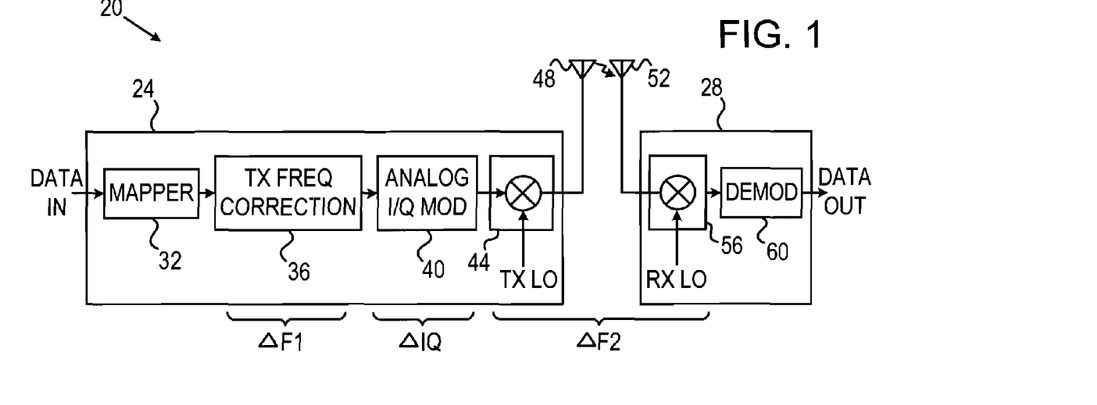
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 comprises a transmitter 24, which transmits to a receiver 28. A system of this sort can be used in a variety of applications, such as in microwave or millimeter-wave links. In the configuration of FIG. 1 (as well as in subsequent figures), only transmitter and receiver elements that are necessary for demonstrating the disclosed techniques are shown. Many transmitter and receiver elements, which are not mandatory for understanding the principles of the disclosed techniques, are not shown in the figures for the sake of clarity.

Transmitter 24 accepts data for transmission from a host system or other source. The transmitter comprises a mapper 32, which maps the bits of the incoming data onto symbols in accordance with a certain modulation scheme. Any suitable modulation scheme can be used, such as, for example, Binary Phase Shift Keying (BPSK), Quaternary Phase Shift Keying (QPSK) or Quadrature Amplitude Modulation (QAM). Typically, mapper 32 selects the symbols from a predefined symbol constellation, which is defined in the two-dimensional In-phase/Quadrature (I/Q) plane. Mapper 32 thus outputs a sequence of complex (I/Q) symbols that represent the data for transmission.

A transmitter frequency correction module 36 applies a certain frequency offset to the sequence of symbols produced by mapper 32. This frequency offset is used, for example, when subsequent frequency conversion operations in the transmitter are performed at a finite frequency granularity. For example, a Local Oscillator (LO) signal used for up-conversion in the transmitter may be produced at a finite frequency granularity. Module 36 can be used to compensate for the resulting frequency inaccuracy. The frequency offset applied by module 36 is denoted $\Delta F1$. Module 36 typically comprises digital circuitry. Any suitable circuitry that is capable of applying frequency offset to a digital signal, such as a Numerically-Controlled Oscillator (NCO), can be used for this purpose.

The digital signal produced by module 36 is typically converted into a pair of analog baseband I and Q signal components using a pair of digital-to-analog converters (not shown). An analog I/Q modulator 40 converts the baseband signals into a single I/Q Intermediate Frequency (IF) signal. I/Q modulator 40 introduces a certain I/Q imbalance into the IF signal. This I/Q imbalance is denoted $\Delta IQ$, and it may comprise gain imbalance, phase imbalance and/or DC offset.

An up-converter 44 up-converts the IF signal to a suitable Radio Frequency (RF). Up-converter 44 typically comprises one or more mixers, which up-convert the IF signal by mixing it with one or more LO signals (denoted TX LO). As noted above, the circuitry that produces the LO signals (e.g., a frequency synthesizer) may have a finite frequency granularity, which is compensated for by the frequency offset $\Delta F1$ applied by module 36. The RF signal produced by up-converter 44 is filtered, amplified and transmitted toward receiver 28 via a transmitter antenna 48.

In receiver 28, the signal is received by a receiver antenna 52 and down-converted by a down-converter 56. Down-converter 56 typically comprises one or more mixers, which down-convert the RF signal to baseband by mixing it with one or more LO signals (denoted RX LO). In many practical scenarios, the up-conversion by up-converter 44 and the down-conversion by down-converter 56 introduce some frequency offset into the baseband signal at the down-converter output. This frequency offset (denoted $\Delta F2$) may be caused, for example, by a frequency difference between the reference clocks that are used for generating the LO signals in the transmitter and the receiver, or for any other reason. The signal produced by down-converter 56 is digitized by one or more analog-to-digital converters (not shown). The digital signal is then demodulated by a demodulator 60, which extracts the data from the signal. The extracted data is provided as output of receiver 28.

As can be seen in the example system of FIG. 1, the signal at the input of demodulator 60 is distorted by three impairments applied in sequence. The signal is first distorted by the frequency offset of module 36 ($\Delta F1$), then by the I/Q imbalance of I/Q modulator 40 ($\Delta IQ$), and finally by the frequency offset between the transmitter and the receiver ($\Delta F2$). Generally, frequency offsets and I/Q imbalance impairments are not commutative. In the specific example of FIG. 1, $\Delta F1$ and $\Delta F2$ cannot be modeled (and corrected) by a single time-invariant frequency offset and a single time-invariant I/Q correction, since $\Delta IQ$ is applied between them.

In some embodiments, demodulator 60 comprises circuitry that compensates for the interleaved sequence of impairments $\Delta F1 \rightarrow \Delta IQ \rightarrow \Delta F2$, and produces a corrected signal having little or no frequency offset or I/Q imbalance.

Figure 2:
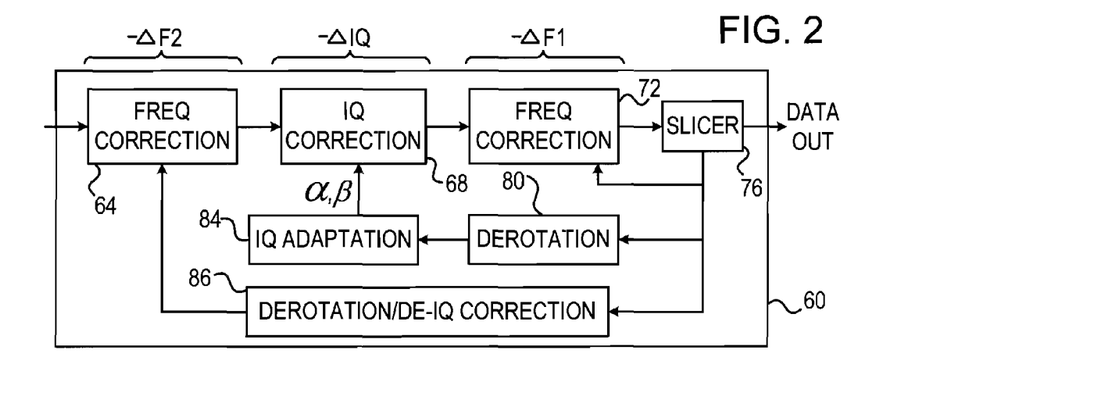
FIGS. 2 and 3 are block diagrams that schematically illustrate demodulators that compensate for I/Q imbalance and frequency offset impairments in the system of FIG. 1, in accordance with embodiments of the present invention.

FIG. 2 is a block diagram that schematically illustrates some of the internal structure of demodulator 60, in accordance with an embodiment of the present invention. Demodulator 60 comprises a cascade of frequency correction and I/Q correction modules, which are arranged in reverse order to the order of the impairments that distort the signal. In the present example, demodulator 60 comprises a frequency correction module 64 that compensates for $\Delta F2$ (i.e., applies a frequency offset of $-\Delta F2$), followed by an I/Q correction module 68 that compensates for $\Delta IQ$, followed by a frequency correction module 72 that compensates for $\Delta F1$.

Frequency correction module 64 can be implemented using any suitable circuitry that applies frequency offset, such as a NCO. I/Q correction module 68 is also usually implemented using digital circuitry. Module 68 typically multiplies the incoming digital signal (which is an I/Q signal, i.e., a sequence of I samples and a respective sequence of Q samples) by one or more 2-by-2 matrix that represents the desired I/Q correction. For example, module 68 can apply a gain imbalance correction $\beta$ by multiplying the signal by a matrix of the form:

$$\begin{bmatrix} 1 & 0 \\ 0 & \beta \end{bmatrix}$$

Additionally or alternatively, module 68 can apply a phase imbalance correction $\alpha$ by multiplying the signal by a matrix of the form:

$$\begin{bmatrix} \cos\frac{\alpha}{2} & \sin\frac{\alpha}{2} \\ \sin\frac{\alpha}{2} & \cos\frac{\alpha}{2} \end{bmatrix}$$

By applying frequency corrections and I/Q corrections in reverse order, modules 64, 68 and 72 in demodulator 60 compensate for the impairment sequence $\Delta F1 \rightarrow \Delta IQ \rightarrow \Delta F2$ with high accuracy. As a result, the corrected signal at the output of the cascade (at the output of module 72) has little or no frequency offset or I/Q imbalance. In other words, the corrected signal comprises a sequence of stable constellation symbols, which are located at the appropriate positions in the I/Q plane.

A slicer circuit 76 extracts the data bits from the corrected signal. Typically, the slicer examines each symbol in the corrected signal, and decides which of the constellation symbols has the shortest distance (in the I/Q plane) to this received symbol. The data bits represented by the selected constellation symbols are provided as output.

In some embodiments, one or more of the frequency corrections and/or I/Q corrections applied by demodulator 60 are set adaptively, based on the data bits that are produced by slicer 76. This process is sometimes referred to as decision-directed adaptation. In the example of FIG. 2, the frequency corrections applied by modules 64 and 72, as well as the I/Q correction applied by module 68, are set adaptively based on the output of slicer 76. In a typical implementation, the demodulator produces one or more decision-directed error signals based on the slicer output, and calculates the I/Q imbalance and frequency offset corrections based on these error signals.

In the present example, demodulator 60 comprises a de-rotation module 80, which de-rotates the decision-directed error signal (which is based on the symbols produced by slicer 76). Module 80 applies a frequency offset of $\Delta F1$, i.e., reverses or compensates for the operation of frequency correction module 72. The de-rotation operation causes the slicer output to have the same frequency offset (i.e., phase rotation rate) as the signal processed by I/Q correction module 68. As such, the de-rotated error signal can be used for setting the I/Q imbalance correction applied by module 68. An I/Q adaptation module 84 computes the appropriate I/Q imbalance correction (e.g., phase imbalance correction a and gain imbalance correction (3, as described above) based on the de-rotated slicer output.

Additionally, demodulator 60 comprises a correction reversal module 86, which applies de-rotation and reverse I/Q imbalance correction to the error signal produced by slicer 76. Module 86 reverses the corrections carried out by modules 68 and 72. As a result, the error signal at the output of module 86 and the signal processed by module 64 are matched with regard to their frequency and I/Q coordinate system. The error signal at the output of module 86 is then used for setting the frequency correction applied by module 64.

In alternative embodiments, any of the frequency corrections and/or I/Q imbalance corrections applied by demodulator 60 may be constant (e.g., hardwired or pre-programmed), or they may be adapted using any other suitable method. For example, a Least Mean Squares (LMS) adaptation process, as is known in the art, can be used.

Figure 3:
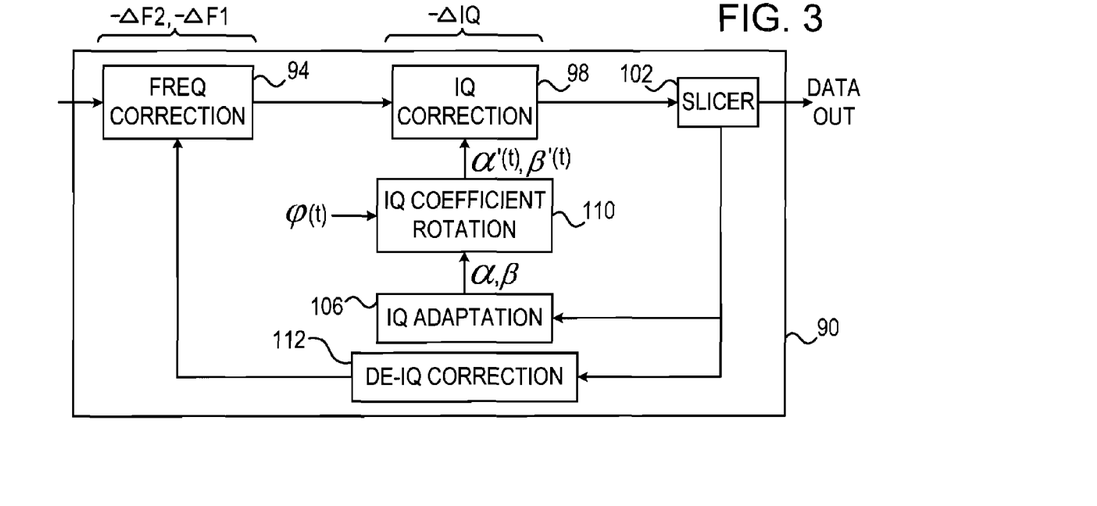

FIG. 3 is a block diagram that schematically illustrates an alternative demodulator 90, which may also be used for correcting the I/Q imbalance and frequency offset impairments in system 20 of FIG. 1 above, in accordance with an embodiment of the present invention. Unlike demodulator 60 of FIG. 2 above, demodulator 90 comprises a single frequency correction module 94, which compensates for both $\Delta F1$ and $\Delta F2$. The output of module 98 is processed by an I/Q correction module 98, which compensates for $\Delta IQ$.

Demodulator 90 comprises a slicer 102 and an I/Q adaptation module 106, similar to slicer 76 and module 84 of FIG. 2 above, respectively. The extracted bits at the output of slicer 102 are used for producing a decision-directed error signal, which is used for setting the frequency correction of module 94 and the I/Q imbalance correction of module 98.

Note, however, that in demodulator 90 there is only one frequency correction, and that corrections are not applied in reverse order to the order of the impairments that distort the signal. As a result, the I/Q corrections to be applied by module 98 are now time-varying, at a rate that depends on $\Delta F1$. Demodulator 90 comprises an I/Q coefficient rotation module 110, which computes these time-varying I/Q corrections. In some embodiments, module 110 accepts as input the phase imbalance correction α and gain imbalance correction β from adaptation module 106. In addition, module 110 accepts a time-varying rotation matrix denoted φ(t), which represents the rotation of the signal in the I/Q plane at a rate of $\Delta F1$. Module 110 rotates the coefficients α and β using φ(t), to produce time-varying coefficients α'(t) and β'(t). The time-varying coefficients are provided to module 98, which applies the time-varying I/Q imbalance correction accordingly.

Demodulator 90 further comprises a correction reversal module 112, which reverses the I/Q imbalance correction applied by module 98. The error signal at the output of module 112 is used for setting the frequency correction applied by module 94.

In comparison to demodulator 60 of FIG. 2 above, demodulator 90 applies only a single frequency correction. On the other hand, the adaptation of the I/Q imbalance correction is considerably more complex because of the continuously time-varying nature of the I/Q corrections. Nevertheless, both demodulator configurations can provide highly-accurate compensation for the interleaved impairment sequence $\Delta F1 \rightarrow \Delta IQ \rightarrow \Delta F2$.

Split-Mount Transmitters with Re-Modulation

In some system applications, the transmitter functions are split between two separate units that are connected by RF cable. For example, the transmitter may comprise an Indoor Unit (IDU) that is connected by coaxial cable to an Outdoor Unit (ODU). The IDU typically comprises the digital processing section of the transmitter (e.g., transmit modem) and some IF circuitry. The ODU typically comprises up-conversion and RF circuitry, and is usually mounted near the antenna. Such a configuration is referred to as a split-mount configuration. In other transmitter configurations (referred to as "single-mount" configurations), the entire transmitter is mounted in an ODU.

Some split-mount transmitters apply re-modulation to the transmitted signal. In these schemes, the signal is up-converted in the IDU to IF and transferred to the ODU over a cable. In the ODU, the IF signal is down-converted to baseband again, and then up-converted again to RF. The down-conversion to baseband is sometimes advantageous, for example in order to use a common baseband-to-RF up-converter for both split-mount and single-mount transmitters. Some aspects of re-modulation in transmitters are addressed in U.S. Pat. No. 6,844,787, whose disclosure is incorporated herein by reference. Some aspects of split-mount transmitters are addressed in PCT International Publications WO 2009/063447 and 2009/083949, whose disclosures are incorporated herein by reference.

Figure 4:
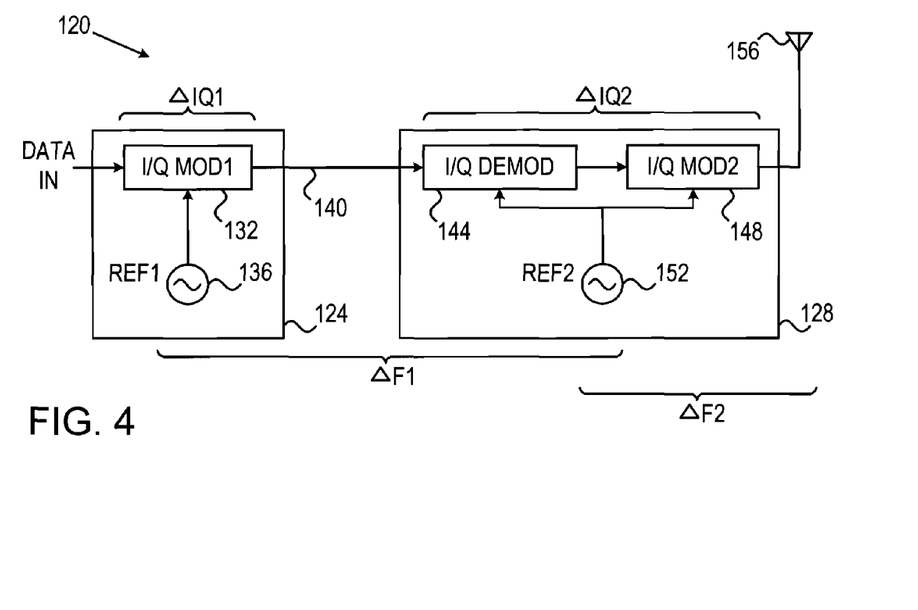
FIG. 4 is a block diagram that schematically illustrates a transmitter, in accordance with an embodiment of the present invention.

FIG. 4 is a block diagram that schematically illustrates a transmitter 120 that uses re-modulation, in accordance with an embodiment of the present invention. Transmitter 120 comprises an Indoor Unit (IDU) 124 and an Outdoor Unit (ODU) 128, which are connected by a cable 140. Data for transmission is modulated in IDU 124 onto a baseband signal, and the signal is up-converted to IF by an I/Q modulator 132.

The I/Q modulator up-converts the signal by mixing it with an LO signal that is synchronized to a reference clock source 136. The IF signal is sent over cable 140 to ODU 128. In the ODU, an I/Q demodulator 144 down-converts the IF signal to baseband again. An I/Q modulator 148 up-converts the baseband signal to RF, and the RF signal is transmitted to a receiver via a transmitter antenna 156. ODU 128 comprises a reference clock source 152, which produces a reference clock signal for producing the LO signals used by I/Q demodulator 144 and I/Q modulator 148. In alternative embodiments, I/Q demodulator 144 and I/Q modulator 148 can be driven by LO signals that are based on separate reference clock sources.

The processing applied to the signal by IDU 124 and ODU 128 demonstrates another example, in which the signal is subjected to an alternating sequence of I/Q imbalance impairments and frequency offsets. First, I/Q modulator 132 causes an I/Q imbalance denoted $\Delta IQ1$. Then, up-conversion by I/Q modulator 132 and down-conversion by I/Q demodulator 144 cause a frequency offset denoted $\Delta F1$, since the IDU and ODU use different reference clock sources. Then, I/Q demodulator 144 and I/Q modulator 148 cause an I/Q imbalance denoted $\Delta IQ2$. (The I/Q imbalance of both components can be modeled as a single imbalance, regardless of whether they are based on the same reference clock or on separate reference clocks.) Finally, a frequency offset between the ODU and the receiver at the other end of the link (not shown) is denoted $\Delta F2$. In summary, the signal is subjected to the alternating sequence of impairments $\Delta IQ1 \rightarrow \Delta F1 \rightarrow \Delta IQ2 \rightarrow \Delta F2$.

Figure 5:
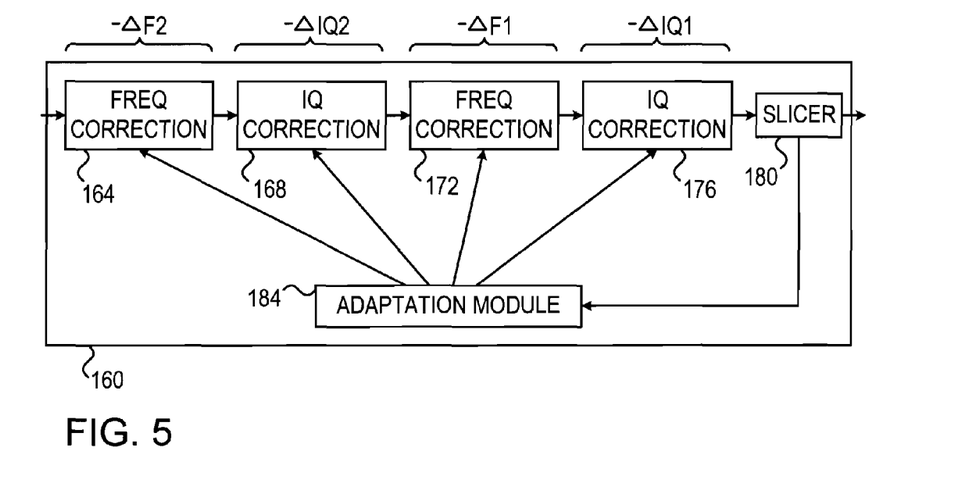
FIG. 5 is a block diagram that schematically illustrates a demodulator that compensates for I/Q imbalance and frequency offset impairments in the transmitter of FIG. 4, in accordance with an embodiment of the present invention.

FIG. 5 is a block diagram that schematically illustrates a demodulator 160 that compensates for the I/Q imbalance and frequency offset impairments in transmitter 120 of FIG. 4 above, in accordance with an embodiment of the present invention. Demodulator 160 can be used in a receiver that receives the signal transmitted from transmitter 120. Demodulator 160 comprises two frequency correction modules and two I/Q correction modules, which are cascaded in reverse order to the order in which the impairments distort the signal.

The cascade comprises a frequency correction module 164 that compensates for $\Delta F2$, followed by an I/Q correction module 168 that compensates for $\Delta IQ2$, then a frequency correction module 172 that compensates for $\Delta F1$, and finally an I/Q correction module 176 that compensates for $\Delta IQ1$. A slicer 180 produces symbol decision, as explained above. The symbols produced by the slicer are processed by an adaptation module 184 in a decision-directed adaptation process. In other words, module 184 computes the frequency and I/Q imbalance corrections to be applied by modules 164, 168, 172 and 176, based on the output of slicer 180.

In the present example, all the frequency and I/Q imbalance corrections are computed in a decision-directed manner. Alternatively, however, any of these corrections may be constant, or it may be adapted using any other suitable method. Typically, a given error signal produced by adaptation module 184 is de-rotated and/or de-I/Q-corrected, in order to match the signal processed by the I/Q correction or frequency correction module it controls. In other words, the error signal that controls a given module in the processing chain is processed so as to reverse the corrections applied by all subsequent modules in the cascade. For example, the signal that, controls module 172 is typically de-rotated to reverse the operation of module 176. The signal that controls module 168 is typically processed so as to reverse the operation of modules 172 and 176.

Note that the alternating sequence of I/Q imbalance and frequency offsets in transmitter 120 is caused, at least partly, by the fact that IDU 124 and ODU 128 use separate reference clock sources (136 and 152, respectively). If the IDU and ODU were to use the same reference clock source (e.g., by transferring a reference clock signal over cable 140), then $\Delta F1$ would be zero. As a result, $\Delta IQ1$ and $\Delta IQ2$ could be represented by a single equivalent I/Q imbalance, and the problem would be simplified considerably. Transferring a reference clock signal over the cable, however, causes design complications and adds to the size, cost and complexity of the system. When using the compensation scheme of FIG. 5, on the other hand, the receiver is able to compensate for the different impairments without having to transfer clock signals over the cable and without compromising receiver performance.

In some implementations of transmitter 120, the baseband sections of the transmitter may introduce I/Q delay mismatch, i.e., delay mismatch between the I and Q signal components. In FIG. 4, for example, I/Q delay mismatch may occur at the input of I/Q modulator 132 in the IDU, and/or between I/Q demodulator 144 and I/Q modulator 148 in the ODU. In some embodiments, demodulator 160 of FIG. 5 may comprise circuitry that compensates for this delay mismatch.

For example, an I/Q delay mismatch at the input of I/Q modulator 132 may be corrected by inserting a delay element (not shown) between I/Q correction module 176 and slicer 180. When a delay mismatch exists between I/Q demodulator 144 and I/Q modulator 148, $\Delta IQ2$ can be modeled by two I/Q imbalances having an intervening delay mismatch. Therefore, the delay mismatch between I/Q demodulator 144 and I/Q modulator 148 may be corrected by inserting a delay element followed by an additional I/Q imbalance correction module (both not shown) between I/Q correction module 168 and frequency correction module 172. In embodiments in which IDU 124 and ODU 128 share the same reference clock source (e.g., by transferring a reference clock signal over cable 140), demodulator 160 can be simplified to include a frequency correction module, followed by an I/Q imbalance correction module, followed by a delay element, followed by another I/Q imbalance correction module, followed by another delay element.

The delay elements in the above-described configurations typically delay one of the I and Q signal components with respect to the other signal component, so as to cancel the corresponding delay mismatch impairment. The delay of a given delay element may be fractional and not necessarily an integer number of samples.

Split-Mount Receivers with Re-Demodulation

In some system applications, the receiver functions are split between two separate units that are connected by RF cable. For example, in some split-mount applications, the receiver functions are split between the ODU and IDU. Some split-mount receivers use a re-demodulation scheme, in which the received RF signal is down-converted to baseband in the ODU and then up-converted to IF in order to send it over the cable. In the IDU, the IF signal is down-converted to baseband again for demodulation. Re-demodulation schemes are sometimes advantageous, for example in order to use a common RF-to-baseband down-converter in both split-mount and single-mount receivers. Certain aspects of receivers that use re-demodulation are addressed in U.S. patent application Ser. No. 12/553,101, which is assigned to the assignee of the present patent application and whose disclosure is incorporated herein by reference.

Figure 6:
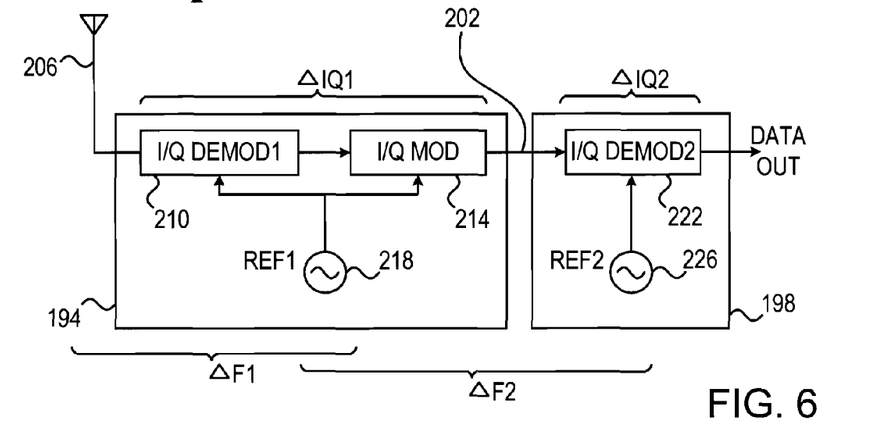
FIG. 6 is a block diagram that schematically illustrates a receiver, in accordance with an embodiment of the present invention.

FIG. 6 is a block diagram that schematically illustrates a receiver 190 that uses re-demodulation, in accordance with an embodiment of the present invention. Receiver 190 comprises an ODU 194 and an IDU 198, which are connected by a cable 202. An RF signal sent from a transmitter (not shown) is received by a receiver antenna 206. An I/Q demodulator 210 down-converts the signal to baseband. An I/Q modulator 214 up-converts the baseband signal to IF. Both I/Q demodulator 210 and I/Q modulator 214 perform frequency conversion by mixing the signal with one or more LO signals. The LO signals in the ODU are synchronized to a reference clock source 218. In IDU 198, an I/Q demodulator 222 down-converts the IF signal to baseband for demodulation. Down-conversion in the IDU is performed using one or more LO signals, which are synchronized to a reference clock source 226. Thus, the ODU and IDU use separate reference clock sources for generating LO signals.

The processing applied to the signal by ODU 194 and IDU 198 show yet another example, in which the signal is subjected to an alternating sequence of I/Q imbalance impairments and frequency offsets. First, the frequency offset between the transmitter (not shown) and ODU 194 is denoted $\Delta F1$. Then, I/Q demodulator 210 and I/Q modulator 214 cause an I/Q imbalance denoted $\Delta IQ1$. (The I/Q imbalance of both components can be modeled as a single imbalance because no frequency offset is applied between them.) Then, up-conversion by I/Q modulator 214 and down-conversion by I/Q demodulator 222 cause a frequency offset denoted $\Delta F2$, since the ODU and IDU use separate reference clock sources. Finally, I/Q demodulator 222 causes an I/Q imbalance denoted $\Delta IQ2$. In summary, the signal is subjected to the alternating sequence of impairments $\Delta F1 \rightarrow \Delta IQ1 \rightarrow \Delta F2 \rightarrow \Delta IQ2$.

Figure 7:
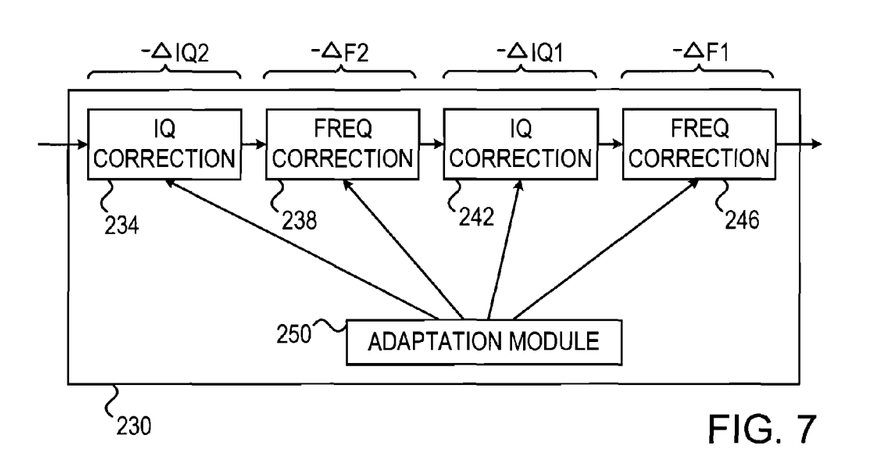
FIG. 7 is a block diagram that schematically illustrates a demodulator that compensates for I/Q imbalance and frequency offset impairments in the receiver of FIG. 6, in accordance with an embodiment of the present invention.

FIG. 7 is a block diagram that schematically illustrates a demodulator 230, which compensates for the I/Q imbalance and frequency offset impairments in receiver 190 of FIG. 6 above, in accordance with an embodiment of the present invention. Demodulator 230 can be used to demodulate the signal produced by I/Q demodulator 222.

Demodulator 230 comprises two I/Q correction modules and two frequency correction modules, which are cascaded in reverse order to the order in which the impairments distort the signal. The cascade comprises an I/Q correction module 234 that compensates for $\Delta IQ2$, followed by a frequency correction module 238 that compensates for $\Delta F2$, then an I/Q correction module 242 that compensates for $\Delta IQ1$, and finally a frequency correction module 246 that compensates for $\Delta F1$.

An adaptation module 250 computes the frequency and I/Q imbalance corrections to be applied by modules 234, 238, 242 and 246. The adaptation unit may receive inputs from one or more points in the cascade, and calculate the frequency and I/Q imbalance corrections based on these inputs. As noted above with respect to module 184 of FIG. 5, adaptation module 250 typically applies de-rotation and/or reverse I/Q imbalance corrections to its outputs, so that each of modules 234, 238, 242 and 246 is controlled by an error signal that matches the signal processed by that module with regard to frequency and I/Q coordinate system.

In the present example, the frequency and I/Q imbalance corrections are computed in a blind adaptation process, i.e., irrespective of the slicer output. Alternatively, however, any of these corrections may be constant, or it may be adapted using any other suitable method.

In some embodiments, demodulator 230 may also compensate for I/Q delay mismatch introduced by baseband sections of transmitter 190. For this purpose, delay elements, and possibly additional I/Q correction modules, may be inserted at the appropriate points in the processing cascade of demodulator 230. The delay mismatch correction can be implemented using similar principles to the delay mismatch correction in demodulator 160 of FIG. 5, as described above. In order to compensate for these I/Q delay mismatches, the processing cascade of demodulator 230 can be modified so as to apply an I/Q delay mismatch correction, followed by an I/Q imbalance correction, followed by a frequency correction, then a second I/Q imbalance correction, then a second I/Q delay mismatch correction, followed by a third I/Q imbalance correction, and finally a second frequency correction. With reference to FIG. 7, demodulator 230 can be modified by adding a delay element before I/Q correction module 234 (at the input of the processing cascade), splitting I/Q imbalance correction module 242 into two separate I/Q imbalance correction modules, and inserting a second delay element between these two I/Q imbalance correction modules.

In this example too, the alternating sequence of I/Q imbalance and frequency offsets is caused, at least partly, by the fact that the ODU and IDU use separate reference clock sources. If the IDU and ODU were to use the same reference clock source (e.g., by transferring a reference clock signal over cable 202), then $\Delta F2$ would be zero, and $\Delta IQ1$ and $\Delta IQ2$ could be represented by a single equivalent I/Q imbalance. Thus, the compensation scheme of FIG. 7 enables the receiver to compensate for the different impairments accurately without having to transfer clock signals over cable 202.

As explained above, the frequency correction modules used in the different demodulator configurations described herein may comprise any suitable circuitry that shifts the frequency of a digital signal, such as a NCO. The I/Q correction modules used in the demodulator configurations described herein may comprise any suitable digital circuitry, such as logic that performs 2-by-2 matrix multiplication. The adaptation units used in the different demodulator configurations described herein can be implemented in hardware, in software, or using a combination of hardware and software elements.

The different demodulator elements may be implemented, for example, in one or more Application-Specific Integrated Circuits (ASIC) or Field-Programmable Gate Arrays (FPGA), and/or using discrete components. The analog transmitter and receiver elements may be implemented using discrete components and/or in one or more RF Integrated Circuits (RFIC) or Monolithic Microwave Integrated Circuits (MMIC).

Compensation Method Description

Figure 8:
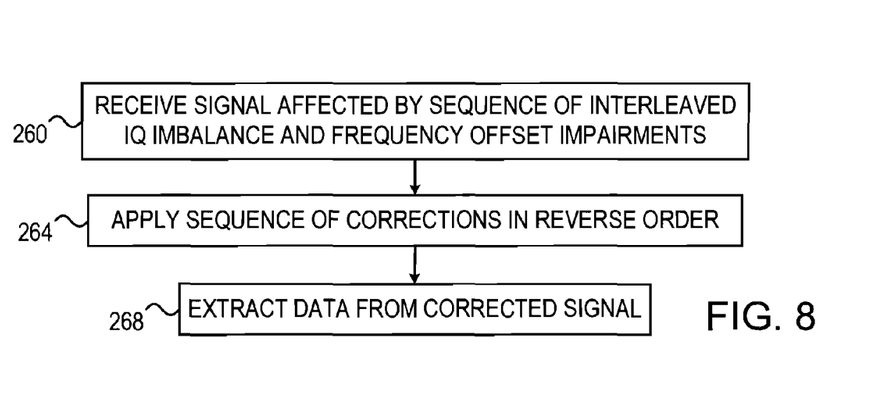
FIG. 8 is a flow chart that schematically illustrates a method for correcting I/Q imbalance and frequency offset impairments, in accordance with an embodiment of the present invention.

FIG. 8 is a flow chart that schematically illustrates a method for correcting I/Q imbalance and frequency offset impairments, in accordance with an embodiment of the present invention. The method begins with a demodulator receiving a signal, which is distorted by an alternating sequence of frequency offset and I/Q imbalance impairments, at an input step 260. The impairment sequence comprises at least (1) two frequency offset impairments with an intervening I/Q imbalance impairment, or (2) two I/Q imbalance impairments with an intervening frequency offset impairment.

The demodulator applies an alternating sequence of frequency corrections and I/Q imbalance corrections, at a correction step 264. Typically, the corrections are performed in reverse order to the order in which the impairments distort the signal. The output of this process is a corrected signal having little or no I/Q imbalance and frequency offset. The demodulator then extracts the data from the corrected signal, an a data extraction step 268. The extracted data is provided as output.

The transmitter and receiver configurations described herein are chosen by way of example. In alternative embodiments, the disclosed techniques can be used in any other suitable system or application in which a signal is distorted by an alternating sequence of frequency offset and I/Q imbalance impairments. Although the embodiments described herein mainly address wireless communication transmitters and receivers, the methods and systems described herein can also be used in wire-line applications that involve RF transmission, such as in cable communication systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
receiving a signal which is distorted by an alternating sequence of impairments, the alternating sequence of impairments including first and second frequency offsets and an In-phase/Quadrature (I/Q) imbalance, the first frequency offset distorting the signal before the I/Q imbalance which distorts the signal before the second frequency offset;
applying a first correction corresponding to the second frequency offset from among a sequence of corrections, a second correction corresponding to the I/Q imbalance from among the sequence of corrections, and a third correction corresponding to the first frequency offset from among the sequence of corrections to the signal to provide a corrected signal to compensate for the alternating sequence of impairments, the first correction being applied before the second correction which is applied before the third correction; and
extracting data from the corrected signal.

2. The method according to claim 1, further comprising:
calculating at least one of the first, the second, or the third corrections based on the extracted data.

3. The method according to claim 2, wherein calculating the corrections comprises:
generating an error signal based on the extracted data;
processing the error signal to isolate the at least one of the first, the second, or third corrections from the extracted data; and
setting the at least one of the first, the second, or the third corrections based on the processed error signal.

4. The method according to claim 1, further comprising:
calculating an error signal based on the extracted data,
de-rotating the error signal to compensate for the third correction, and
calculating the second correction based on the de-rotated error signal.

5. The method according to claim 1, wherein the applying comprises:
applying the first correction to the signal to compensate for the second frequency offset,
applying the second correction to the signal after applying the first correction to compensate for the I/Q imbalance, and
rotating the second correction to compensate for the first frequency offset.

6. The method according to claim 1, wherein at least one of the first and second frequency offsets is caused by a deviation between a first reference clock in a transmitter transmitting the signal and a second reference clock in a receiver receiving the signal.

7. The method according to claim wherein at least one of the first and second frequency offsets is caused by a digital frequency offset in a transmitter transmitting the signal.

8. A communication apparatus for compensating for distortion in a signal caused by an alternating sequence of impairments, the alternating sequence of impairments including first and second frequency offsets and an In-phase/Quadrature (I/Q) imbalance, first frequency offset distorting the signal before the I/Q imbalance which distorts the signal before the second frequency offset, comprising:
compensation circuitry configured to apply a first correction corresponding to the second frequency offset from among a sequence of corrections, a second correction corresponding to the (I/Q) imbalance from among the sequence of corrections, and a third correction corresponding to the first frequency offset from among the sequence of corrections, to the signal to provide a corrected signal to compensate for the alternating sequence of impairments, the first correction being applied before the second correction which is applied before the third correction; and
a slicer unit configured to extract data from the corrected signal.

9. The apparatus according to claim 8, wherein the compensation circuitry is configured to calculate at least one of the first, the second, or the third corrections in the sequence based on the extracted data.

10. The apparatus according to claim 9, wherein the compensation circuitry is configured:
to generate an error signal based on the extracted data,
to process the error signal to isolate the at least one of the first, the second, or the third corrections from the extracted data, and
to set the at least one of the first, the second, or the third corrections based on the processed error signal.

11. The apparatus according to claim 8, wherein the compensation circuitry is configured:
to calculate an error signal based on the extracted data,
to de-rotate the error signal so as to compensate for the third correction, and
to calculate the second correction based on the de-rotated error signal.

12. The apparatus according to claim 8, wherein the compensation circuitry is configured:
to apply the first correction to the signal to compensate for the second frequency offset,
to apply the second correction to the signal after applying the first correction to compensate for the I/Q imbalance, and
to rotate the second correction to compensate for the first frequency offset.

13. The apparatus according to claim 8, wherein at least one of the first and second frequency offsets is caused by a deviation between a first reference clock in a transmitter transmitting the signal and a second reference clock in a receiver receiving the signal.

14. The apparatus according to claim 8, wherein at least one of the first and second frequency offsets is caused by a digital frequency offset in a transmitter transmitting the signal.

* * * * *